US009989399B2

(12) United States Patent
Miyagawa (10) Patent No.: US 9,989,399 B2
(45) Date of Patent: Jun. 5, 2018

(54) LIQUID SURFACE SENSING DEVICE (71) Applicant: DENSO CORPORATION, Kariya, Aichi-pref. (JP)

(72) Inventor: Isao Miyagawa, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 162 days.

(21) Appl. No.: 14/901,667

(22) PCT Filed: Jun. 30, 2014

(86) PCT No.: PCT/JP2014/003453
§ 371 (c)(1),
(2) Date: Dec. 28, 2015

(87) PCT Pub. No.: WO2015/001778
PCT Pub. Date: Jan. 8, 2015

(65) Prior Publication Data
US 2016/0161321 A1    Jun. 9, 2016

(30) Foreign Application Priority Data
Jul. 1, 2013 (JP) .................. 2013-138098

(51) Int. Cl.
*G01F 23/32* (2006.01)
*G01F 23/38* (2006.01)

(52) U.S. Cl.
CPC .................. *G01F 23/38* (2013.01)

(58) Field of Classification Search
CPC ........ G01F 23/38; G01F 23/363; G01F 23/36; G01F 23/32; G01F 23/34
(Continued)

(56) References Cited

U.S. PATENT DOCUMENTS 5,789,821 A * 8/1998 Shiga ...................... F02N 11/00
                                                        290/38 R
6,747,540 B1 * 6/2004 Nakase ................... H01F 38/12
                                                        336/107
(Continued)

FOREIGN PATENT DOCUMENTS

JP    H10115505 A    5/1998
JP    2003177051 A   6/2003
(Continued)

OTHER PUBLICATIONS

International Search Report and Written Opinion (in Japanese with English Translation) for PCT/JP2014/003453, dated Sep. 16, 2014; ISA/JP.

*Primary Examiner* — Eric S McCall
*Assistant Examiner* — Mohammed E Keramet-Amircolai
(74) *Attorney, Agent, or Firm* — Harness, Dickey & Pierce, P.L.C.

(57) ABSTRACT

A liquid surface sensing device includes a rotational body that is made of resin and rotates according to upward and downward motion of a surface of liquid in a container, a magnet that is held by the rotational body to rotate together with the rotational body, a stationary body that is fixed to the container and rotatably bears the rotational body, and a magnetoelectric conversion element that is embedded in the stationary body and detects a magnetic field generated by the magnet to output an electric signal indicating the liquid surface. The rotational body includes a storage space that accommodates the magnet, a resilient claw that projects into the storage space and is in contact with the magnet in its resiliently deformed state to press the magnet on a storage wall for the storage space, and a projection that projects from an opposite side of the magnet toward the resilient claw (Continued)

in the storage space and expands to be in contact with the resilient claw.

11 Claims, 9 Drawing Sheets

(58) Field of Classification Search
USPC .......................................................... 73/317
See application file for complete search history.

(56) References Cited

U.S. PATENT DOCUMENTS

| | | | |
|---|---|---|---|
| 9,453,756 B2* | 9/2016 | Ogasawara | G01F 23/38 |
| 2002/0104979 A1* | 8/2002 | Kato | F02M 25/0836 |
| | | | 251/129.17 |
| 2003/0178909 A1* | 9/2003 | Kusase | H02K 19/22 |
| | | | 310/254.1 |
| 2006/0198747 A1* | 9/2006 | Uno | F01C 1/0246 |
| | | | 418/55.2 |
| 2012/0285240 A1* | 11/2012 | Yasuda | G01F 23/38 |
| | | | 73/313 |
| 2013/0140477 A1* | 6/2013 | Shimane | H02K 7/116 |
| | | | 251/129.01 |

FOREIGN PATENT DOCUMENTS

| | | |
|---|---|---|
| JP | 2005029128 A | 2/2005 |
| JP | 2010139490 A | 6/2010 |
| JP | 2012237593 A | 12/2012 |

* cited by examiner

LIQUID SURFACE SENSING DEVICE

CROSS REFERENCE TO RELATED APPLICATIONS

This application is a U.S. National Phase Application under 35 U.S.C. 371 of International Application No. PCT/JP2014/003453 filed on Jun. 30, 2014 and published in Japanese as WO 2015/001778 A1 on Jan. 8, 2015. This application is based on and claims the benefit of priority from Japanese Patent Application No. 2013-138098 filed on Jul. 1, 2013. The entire disclosures of all of the above applications are incorporated herein by reference.

TECHNICAL FIELD

The present disclosure relates to a liquid surface sensing device that detects the liquid surface of liquid.

BACKGROUND ART

In the past, a liquid surface sensing device has been known that detects the liquid surface by connecting a rotational body that is pivoted by a stationary body fixed to a tank and a float that floats on the liquid surface of the liquid within the tank by an arm, and converting vertical motion of the float according to the liquid surface into rotational motion of the rotational body. As an example of such a liquid surface sensing device, in a device disclosed in Patent Document 1, when the liquid surface changes and a float moves vertically, magnets rotate, the magnetic flux density of the line of magnetic force passing through a magnetoelectric conversion element changes, and an electric signal corresponding to it is outputted. Also, because the device disclosed in Patent Document 1 can reduce the shift of the relative position between the magnets and the magnetoelectric conversion element by elastically deforming elastic claws and pressing in the magnets, the detection accuracy of the liquid surface based on the sensing result of the magnetic flux density of the magnets is high.

PRIOR ART DOCUMENT

Patent Document

Patent Document 1: JP2010-139490A

However, according to the engaging method of elastically deforming the elastic claws and pressing in the magnets, the rotational body that holds the magnets absorbs the liquid and expands (swells), or absorbs heat and expands. Therefore, there was a case a strain was generated in the shaft section and the positional relation between the magnets and the magnetoelectric conversion element changed. In this case, the detection accuracy of the liquid surface based on the sensing result of the generated magnetic field comes to deteriorate.

SUMMARY OF INVENTION

The present disclosure addresses the above issues. Thus, it is an objective of the present disclosure to provide a liquid surface sensing device that improves the detection accuracy of the liquid surface.

To achieve the objective of the present disclosure, a liquid surface sensing device for detecting a surface of liquid in a container in a first aspect of the present disclosure includes a rotational body, a magnet, a stationary body, and a magnetoelectric conversion element. The rotational body is made of resin and rotates according to upward and downward motion of the surface of liquid. The magnet is held by the rotational body to rotate together with the rotational body. The stationary body is fixed to the container and rotatably bears the rotational body. The magnetoelectric conversion element is embedded in the stationary body and detects a magnetic field generated by the magnet to output an electric signal indicating the surface of liquid. The rotational body includes a storage space, a resilient claw, and a projection. The storage space accommodates the magnet. The resilient claw projects into the storage space and is in contact with the magnet in its resiliently deformed state to press the magnet on a storage wall for the storage space. The projection projects from an opposite side of the magnet toward the resilient claw in the storage space and expands to be in contact with the resilient claw.

According to such an aspect, the liquid surface can be detected by the magnetoelectric conversion element that detects the generated magnetic field of the magnets that are held by the resin-made rotational body rotating according to the vertical motion of the liquid surface and rotate along with the rotational body, and outputs the electric signal that expresses the liquid surface. Here, by that the resilient claws that project to the storage space press the magnets to the storage wall of the storage space in a resiliently deformed state, the holding position can be stabilized. Also, because the projections that project from the opposite side of the magnets toward the resilient claws abut upon the resilient claws by expansion in the storage space, the magnets can be held in a state of a large load. From the above, because the change of the positional relation between the magnets and the magnetoelectric conversion element is suppressed, a liquid surface sensing device that improves the detection accuracy of the liquid surface can be provided.

The resilient claw in a second aspect of the present disclosure includes a distal end, a first abutting section that is in contact with the magnet, and a second abutting section that expands to be in contact with the projection. The second abutting section is provided on the distal end-side of the first abutting section.

According to such an aspect, by the resilient claws that include the first abutting sections abutting upon the magnets and the second abutting sections abutting upon the projections, the projections expand, and a load can be applied to the magnets. Also, by the projections that abut upon the second abutting sections on the distal ends side of the first abutting sections, a load applied to the magnets by the resilient claws can be increased by the principle of the leverage. Therefore, the magnets can be held in a state of a large load. From the above, because the change of the positional relation between the magnets and the magnetoelectric conversion element is suppressed, a liquid surface sensing device that improves the detection accuracy of the liquid surface can be provided.

The resilient claw in a third aspect of the present disclosure includes a root, a first abutting section that is in contact with the magnet, and a second abutting section that expands to be in contact with the projection. The second abutting section is provided on the root-side of the first abutting section.

According to such an aspect, by the resilient claws that include the first abutting sections abutting upon the magnets and the second abutting sections abutting upon the projections, the projections expand and can apply a load to the magnets. Also, by the projections that abut upon the second abutting sections on the roots side of the first abutting sections, the resilient deformation amount of the resilient claws relative to the displacement amount of the projections increases when the projections expand, and therefore the repulsive force can be increased. Therefore, the magnets can be held in a state of a large load. From the above, because the change of the positional relation between the magnets and the magnetoelectric conversion element is suppressed, a liquid surface sensing device that improves the detection accuracy of the liquid surface can be provided.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Below, a plurality of embodiments will be explained based on the drawings. Also, in each embodiment, there is a case that duplicated explanation is omitted by marking a corresponding constituent element with a same reference sign. In the case only a part of the configuration is explained in each embodiment, with respect to a part other than the configuration, a configuration of other embodiment explained previously can be applied. Also, not only a combination of configurations explicitly shown in explanation of each embodiment but also a partial combination of configurations of embodiments is possible even when it is not explicitly shown as far as the combination does not cause a problem particularly.

First Embodiment

Figure 1:
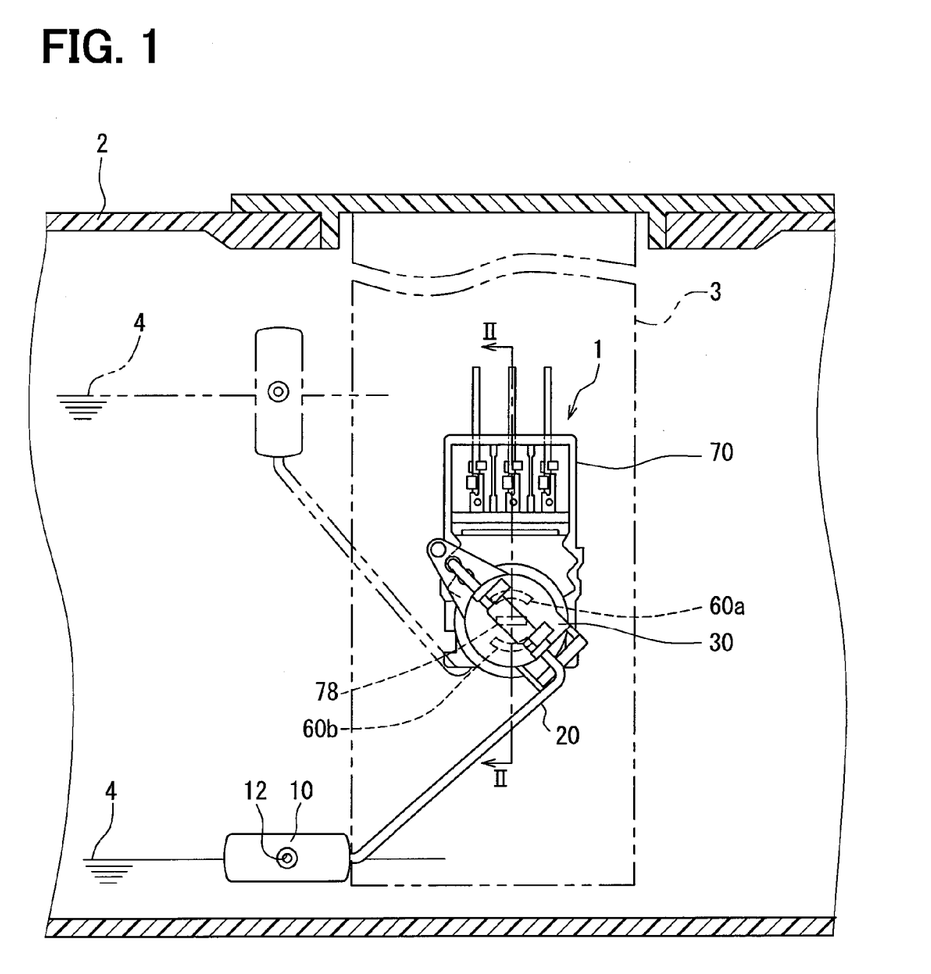
FIG. 1 is a front view of a liquid surface sensing device in a first embodiment.
Figure 2:
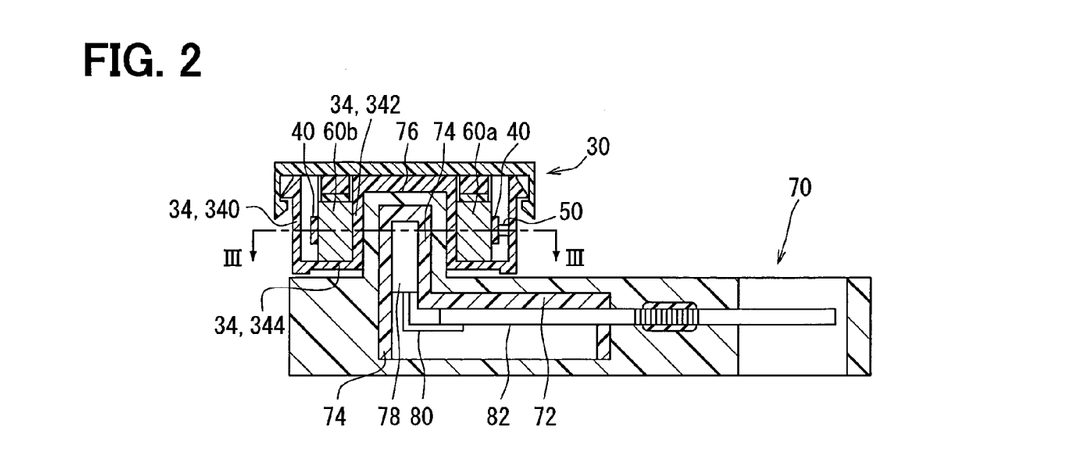
FIG. 2 is a cross-sectional view taken along the line II-II of FIG. 1, and is the cross-sectional view showing a rotational body and a stationary body.

As shown in FIG. 1, a liquid surface sensing device 1 of the present embodiment is installed inside a fuel tank 2 as a container that stores fuel as liquid. The liquid surface sensing device 1 detects the height of a liquid surface 4 of the fuel stored in the fuel tank 2 in a state held by a fuel pump module 3 and the like. As shown in FIGS. 1, 2, the liquid surface sensing device 1 includes a float 10, an arm 20, a rotational body 30, a pair of magnets 60a, 60b, and a stationary body 70.

The float 10 is formed of a material such as foamed ebonite for example having a specific gravity less than that of the fuel, and is floatable by the liquid surface 4 of the fuel. The float 10 is supported by the rotational body through the arm 20.

The arm 20 is formed into a bendable round bar shape by a metal material such as a stainless steel for example. Also, one end is inserted to a through hole 12 formed in the float 10, and the other end is attached to the rotational body 30.

The rotational body 30 is formed of a resin material such as a polyphenylene sulphide (PPS) resin for example into a disk shape having a cylindrical hole 32. The rotational body 30 is configured to rotate according to the vertical motion of the liquid surface 4 by supporting the float 10 through the arm 20.

The pair of magnets 60a, 60b that are permanent magnets for example, is configured to be supported by the rotational body 30 and to rotate along with the rotational body 30.

The stationary body 70 is made of a resin such as a PPS resin for example, and is fixed to the inner wall inside the fuel tank 2 through the fuel pump module 3 for discharging the fuel from the inside of the fuel tank 2 to the outside. The stationary body 70 exhibits a bottomed container shape by a bottom wall 72 that is formed into a rectangular plate shape and side walls 74 that are erected along the outer edge portion of the bottom wall 72. Also, in the stationary body 70, a shaft section 76 that comes to have an attitude of projecting horizontally with respect to the horizontal surface formed by the liquid surface 4 is formed into a cylindrical shape. The rotational body 30 is made rotatable around the rotation axis by pivoting the shaft section 76 by the cylindrical hole 32 of the rotational body 30.

Also, in the shaft section 76 of the stationary body 70, a magnetoelectric conversion element 78 is embedded. The magnetoelectric conversion element 78 is a detection element that detects the relative angle of the rotational body 30 with respect to the stationary body 70, and is a Hall IC for example which detects the magnetic flux density utilizing the Hall effect. A lead wire 80 is extended from the magnetoelectric conversion element 78, and the lead wire 80 is connected to a terminal 82. Also, the magnetoelectric conversion element 78 outputs electric signals to external devices through the terminal 82 and the like by detecting the generated magnetic field of the pair of magnets 60a, 60b.

Next, the arrangement of the magnets 60a, 60b of such the liquid surface sensing device 1 will be explained in detail using FIG. 4. Also, the inner periphery side in the explanation below expresses the rotation axis side where the cylindrical hole 32 exists in the radial direction of the rotational body 30, and the outer periphery side expresses the opposite side of the rotation axis.

The magnets 60a, 60b are disposed at two locations that oppose each other across the shaft section 76. Here, the magnets 60a, 60b can be securely attached to and held by a bearing wall 342 described below because the inner periphery side of the rotational body 30 is formed into a recessed surface recessed in a cylindrical shape.

Although it is not illustrated, the pair of magnets 60a, 60b is configured such that different poles oppose each other. For example, the outer periphery side is the S-pole and the inner periphery side is the N-pole in the magnet 60a, whereas the inner periphery side is the S-pole and the outer periphery side is the N-pole in the other magnet 60b. By such arrangement of the magnetic poles, the magnetic flux is formed so as to be directed from the inner periphery side of the magnet 60a to the inner periphery side of the magnet 60b through the shaft section 76. Also, when the magnets 60a, 60b rotate along with the rotational body 30, the component in the detection direction of the magnetic flux density in the magnetoelectric conversion element 78 embedded in the shaft section 76 of the stationary body 70 changes based on the cosine function, and therefore the relative angle of the rotational body 30 with respect to the stationary body 70 is detected.

However, the density of the magnetic flux going through the shaft section 76 changes according to the distance between the magnetoelectric conversion element 78 and the magnetic poles of the respective magnets 60a, 60b. For example, when the position of the magnets 60a, 60b is shifted to the outer periphery side, the density of the magnetic flux going through the shaft section 76 reduces, and the output of the magnetoelectric conversion element 78 drops.

Here, the rotational body 30 that holds the magnets 60a, 60b will be explained in detail. The rotational body 30 includes a storage wall 34, a storage space 36, resilient claws 40, and projections 50.

The storage wall 34 is formed by an outer peripheral wall 340, a bearing wall 342, a disk bottom wall 344, and stationary walls 346. The outer peripheral wall 340 is formed into a cylindrical shape in the peripheral direction in the outermost periphery. Also, the bearing wall 342 is formed into a cylindrical shape in the peripheral direction in order to form the cylindrical hole 32 in the center of the rotational body 30. Further, the disk bottom wall 344 is formed into a disk shape, and separates the rotational body 30 and the stationary body 70 from each other. Furthermore, the stationary walls 346 are formed so as to project perpendicularly from the disk bottom wall 344, and are disposed by one pair each in both ends in the peripheral direction of each of the magnets 60a, 60b. Also, the storage space 36 is surrounded by the inner surfaces of the storage wall 34 such as the surface on the inner periphery side of the outer peripheral wall 340, the surface on the outer periphery side of the bearing wall 342, the surface on the arm 20 side of the disk bottom wall 344, and the surfaces on the magnets 60a, 60b side adjacent to the stationary walls 346. Further, the storage space 36 stores the magnets 60a, 60b.

Also, the rotational body 30 includes the resilient claws 40 and the projections 50 which are arranged corresponding to each of the magnets 60a, 60b.

The resilient claws 40 are formed integrally with the outer peripheral wall 340 so as to extend from two locations that oppose each other across the shaft section 76 in the outer peripheral wall 340, and project to the storage space 36 from the side of roots 42 that are integrated with the outer peripheral wall 340 toward distal ends 44 side. Also, the resilient claw 40 includes a first abutting section 46 that bends to the outer periphery side (here the opposite side of the magnet 60a or 60b), and a second abutting section 48 that is arranged on the distal end 44 side of the resilient claw 40 of the first abutting section 46 and bends to the inner periphery side (here the magnet 60a or 60b side). The resilient claw 40 thus formed is configured to be resiliently deformed around the fulcrum of the root 42 when a force to the outer periphery side or the inner periphery side is applied to the first abutting section 46 or the second abutting section 48.

Figure 4:
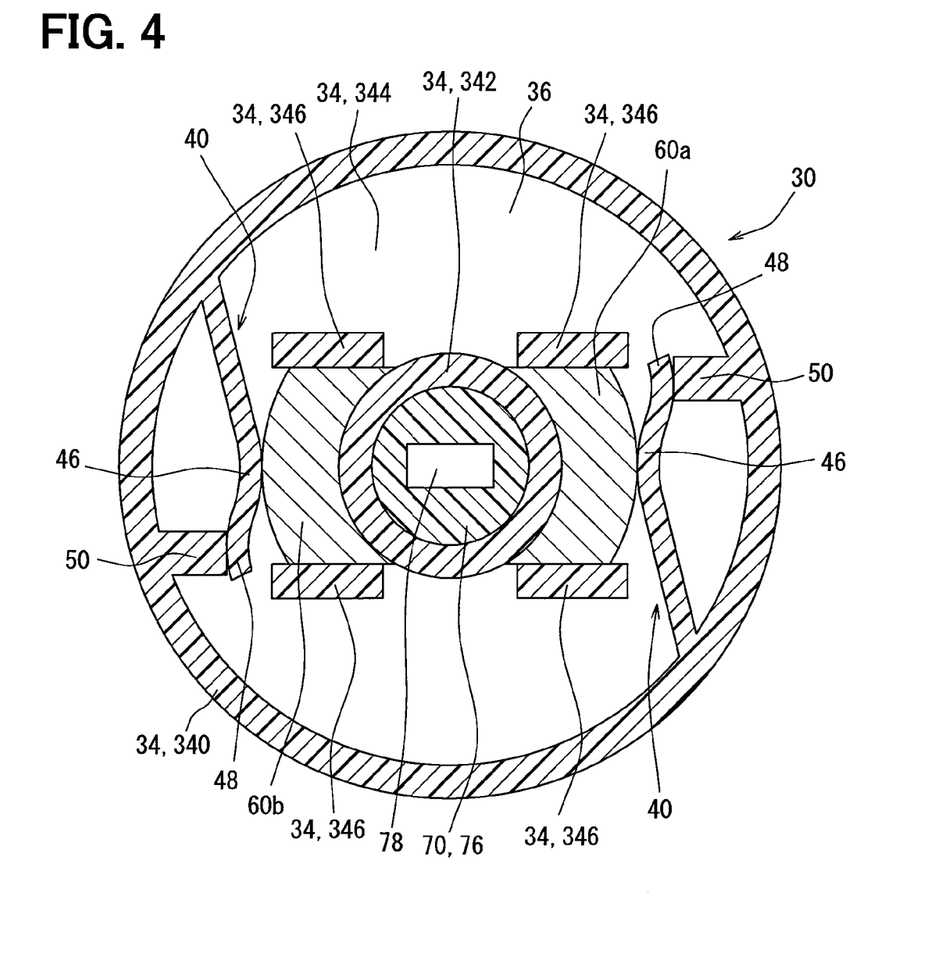
FIG. 4 is a cross-sectional view taken along the line III-III of FIG. 2, and is the cross-sectional view showing the rotational body after incorporating the magnets.

Also, the resilient claw 40 in a state shown in FIG. 4 in which the magnets 60a, 60b have been incorporated presses the magnet 60a or 60b to the storage wall 34 of the storage space 36 by abutting upon the magnet 60a, 60b at the first abutting section 46. More specifically, because the resilient claws 40 abut upon the magnet 60a, 60b in a state of being resiliently deformed to the outer periphery side around the fulcrum of the root 42, the resilient claws 40 press the magnets 60a, 60b to the bearing wall 342 of the storage space 36 from the outer periphery side to the inner periphery side in the radial direction of the rotational body 30 by a repulsive force.

The projections 50 are formed integrally with the outer peripheral wall 340 so as to extend from two locations other than the roots 42 of the resilient claws 40, the two locations opposing each other across the shaft section 76 in the outer peripheral wall 340, and are formed into a columnar shape projecting from the outer peripheral wall 340 positioned on the opposite side of the magnet 60a or 60b toward the second abutting sections 48 of the resilient claws 40. Also, distal ends 52 of the projections 50 are formed into a flat surface shape.

Further, the projections 50 in a state shown in FIG. 4 in which the magnets 60a, 60b have been incorporated abut upon the resilient claws 40 at the second abutting sections 48 by a resiliently deformed state of the resilient claws 40 to the outer periphery side.

The liquid surface sensing device 1 of the present embodiment is installed inside the fuel tank 2 that stores fuel as described above. In other words, the liquid surface sensing device 1 comes to be immersed inside the fuel according to the storage amount of the fuel. In this case, in the projections 50 made of a resin, swelling of absorption of the fuel and expansion occurs. On the other hand, when the liquid surface sensing device 1 is mounted on a vehicle and so on, depending on the use environment, the projections 50 made of a resin expand by heat. The projections 50 expanding by such expansion abut upon the second abutting sections 48 of the resilient claws 40 and come to apply a load to the inner periphery side namely to the magnet 60a or 60b side, and the load increases corresponding to the expansion.

Thus, because the resilient claws 40 and the projections 50 are disposed on the outer periphery side of the magnets 60a, 60b so as to suppress the drop of the output of the magnetoelectric conversion element 78 described above, the magnets 60a, 60b are held by the rotational body 30.

Such incorporation of the magnets 60a, 60b to the rotational body 30 is executed as described below. In the rotational body 30 shown in FIG. 3 of the time before incorporating the magnets 60a, 60b, the stationary walls 346 forming the storage wall 34 are detached. Also, the resilient claws 40 that project from the outer peripheral wall 340 are in a state of not being resiliently deformed, and the distal ends 44 are positioned on the inner periphery side compared to a state the magnets 60a, 60b have been incorporated. Therefore, the resilient claws 40 and the projections are in a state of not abutting upon each other.

Figure 3:
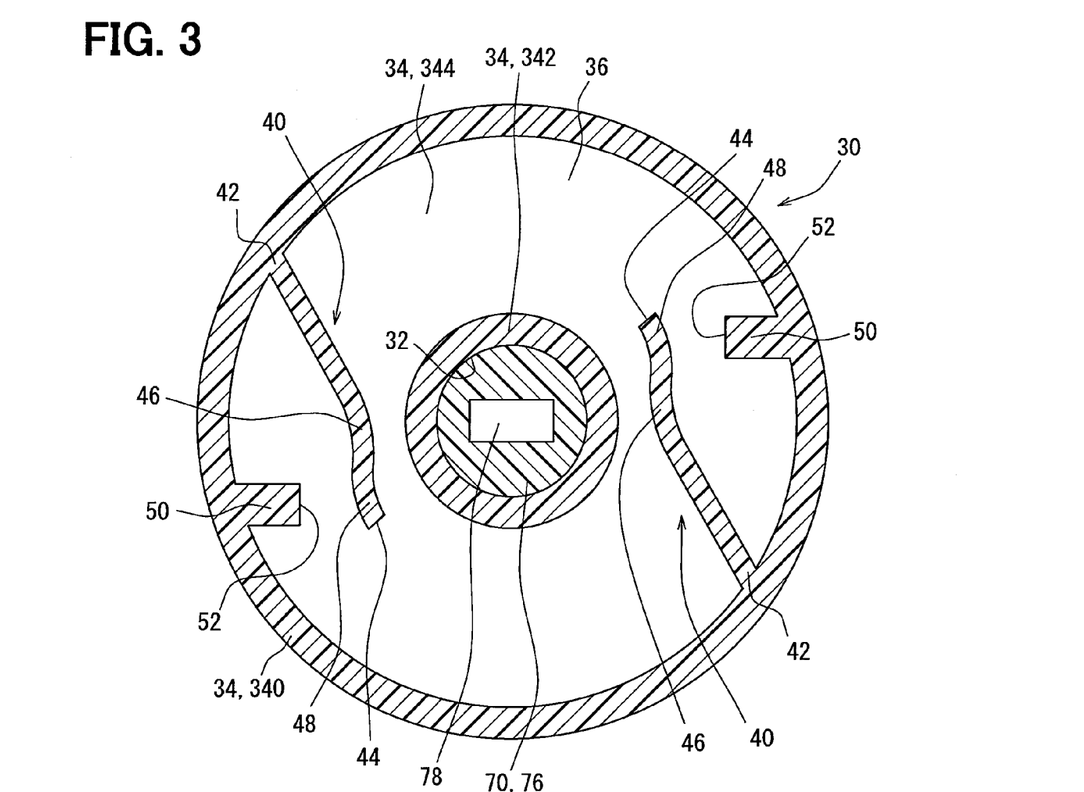
FIG. 3 is a cross-sectional view taken along the line III-III of FIG. 2, and is the cross-sectional view showing the rotational body before incorporating the magnets.

First, by shifting the distal ends 44 of the respective resilient claws 40 of FIG. 3 to the outer periphery side by resilient deformation, the gaps of two locations larger than the size of the magnets 60a, 60b are formed between the bearing wall 342 and the respective resilient claws 40 (this state is not illustrated). Also, the magnets 60a, 60b of a baumkuchen shape are stored in each gap of the two locations. Further, at both ends in the peripheral direction of the magnets 60a, 60b, the pairs of stationary walls 346 are installed and fixed perpendicularly to the disk bottom wall 344. Because the magnets 60a, 60b are stored in and incorporated into the storage space 36 while being suppressed to be thus pressed in, the rotational body 30 comes to have such layout as FIG. 4.

The actions and effects of a first embodiment explained above will be explained below.

According to the first embodiment, the liquid surface 4 can be detected by the magnetoelectric conversion element 78 that detects the generated magnetic field of the magnets 60a, 60b that are held by the rotational body 30 made of a resin which rotates according to the vertical motion of the liquid surface 4 and rotate along with the rotational body 30, and outputs an electric signal that expresses the liquid surface 4. Here, by that the resilient claws 40 projecting to the storage space 36 press the magnets 60a, 60b to the storage wall 34 of the storage space 36 in a resiliently deformed state, the holding position can be stabilized. Also, because the projections 50 projecting toward the resilient claws 40 from the opposite side of the magnets 60a, 60b in the storage space 36 abut upon the resilient claws 40 by expansion, the magnets 60a, 60b can be held in a state of a large load. From the above, because change of the positional relation between the magnets 60a, 60b and the magnetoelectric conversion element 78 is suppressed, the liquid surface sensing device 1 that improves the detection accuracy of the liquid surface 4 can be provided.

Also, according to the first embodiment, by the resilient claws 40 that include the first abutting sections 46 abutting upon the magnets 60a, 60b and the second abutting sections 48 abutting upon the projections 50, the projections 50 expand and can apply a load to the magnets 60a, 60b. Also, by the projections 50 that abut upon the second abutting sections 48 on the distal ends 44 side of the first abutting sections 46, a load applied to the magnets 60a, 60b by the resilient claws 40 can be increased by the principle of the leverage. Therefore, the magnets 60a, 60b can be held in a state of a large load. From the above, because change of the positional relation between the magnets 60a, 60b and the magnetoelectric conversion element 78 is suppressed, the liquid surface sensing device 1 that improves the detection accuracy of the liquid surface 4 can be provided.

Also, according to the first embodiment, the magnets 60a, 60b can be held while suppressing generation of a strain in the shaft section 76 by the resilient claws 40 that press the magnets 60a, 60b to the storage wall 34 on the inner periphery side of the rotational body 30. Therefore, the liquid surface sensing device 1 that improves the detection accuracy of the liquid surface 4 can be provided.

Second Embodiment

Figure 5:
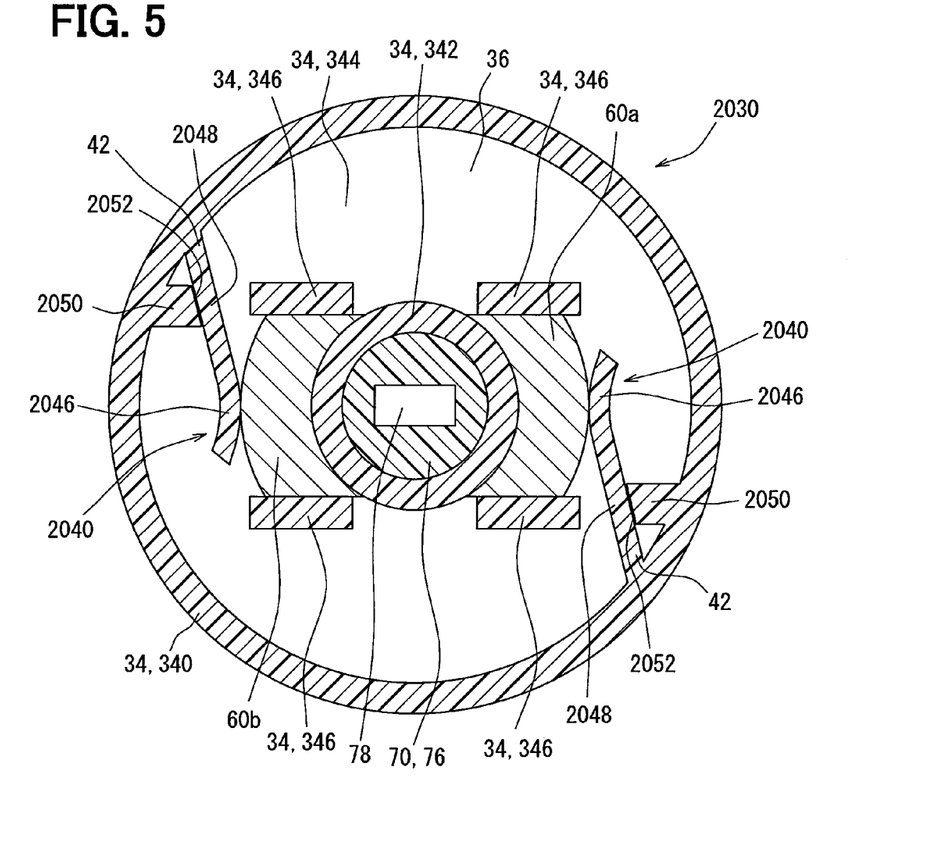
FIG. 5 is a cross-sectional view showing a rotational body in a second embodiment.

As shown in FIG. 5, a second embodiment is a modification of the first embodiment. With respect to the second embodiment, the points different from the first embodiment will be mainly explained.

A rotational body 2030 of the present embodiment is made of a resin such as a PPS resin, and includes resilient claws 2040 and projections 2050 which are arranged corresponding to the respective magnets 60a, 60b.

The resilient claws 2040 are formed integrally with the outer peripheral wall 340 so as to extend from two locations that oppose each other across the shaft 76 in the outer peripheral wall 340, and project to the storage space 36 from the side of roots 42 that are integrated with the outer peripheral wall 340 toward the distal ends 44 side. Also, the resilient claw 2040 includes a first abutting section 2046 that bends to the outer periphery side (here the opposite side of the magnet 60a or 60b), and a second abutting section 2048 that is arranged on the root 42 side of the resilient claw 2040 of the first abutting section 2046 and extends linearly. The resilient claw 2040 thus formed is configured to be resiliently deformed around the fulcrum of the root 42 when a force to the outer periphery side or the inner periphery side is applied to the first abutting section 2046 or the second abutting section 2048.

Also, similarly to the first embodiment, the resilient claws 2040 abut upon the magnets 60a, 60b at the first abutting sections 2046, and thereby press the magnets 60a, 60b to the storage wall 34 of the storage space 36.

The projections 2050 are formed integrally with the outer peripheral wall 340 so as to extend from two locations other than the roots 42 of the resilient claws 2040, the two locations opposing each other across the shaft section 76 in the outer peripheral wall 340, and are formed into a columnar shape projecting from the positions close to the roots 42 of the resilient claws 2040 toward the second abutting sections 2048 of the resilient claws 2040. Also, distal ends 2052 of the projections 2050 are formed into a flat surface shape that lines the second abutting sections 2048. More specifically, the distal ends 2052 of the projections 2050 are of inclined surfaces having an inclination with respect to the side surfaces of a columnar shape, and are formed to be low on the roots 42 side of the resilient claws 2040 and to be high on the distal ends 44 side.

Further, the projections 2050 abut upon the resilient claws 2040 that are in a state of being resiliently deformed to the outer periphery side at the second abutting sections 2048 by the state of the resilient claws 2040 of being resiliently deformed to the outer periphery side. Thus, it is designed so that the projections 2050 whose distal ends 2052 are inclined surfaces lining the second abutting sections 2048 and the second abutting sections 2048 abut upon each other so as to have large abutting areas.

The actions and effects of the second embodiment will be described. In the second embodiment explained above, with respect to the configurations common to the first embodiment, the actions and effects according to the first embodiment can be exerted by the projections 2050 that abut upon the resilient claws 2040 by expansion.

Also, according to the second embodiment, by the resilient claws 2040 that include the first abutting sections 2046 abutting upon the magnets 60a, 60b and the second abutting sections 2048 abutting upon the projections 2050, it becomes possible that the projections 50 expand and apply a load to the magnets 60a, 60b. Also, by the projections 2050 that abut upon the second abutting sections 2048 on the roots 42 side of the first abutting sections 2046, when the projections 2050 expand, a repulsive force can be increased because the resilient deformation amount of the resilient claws 2040 with respect to the displacement amount of the projections 2050 increases. Therefore, the magnets 60a, 60b can be held in a state of a large load. From the above, because the change of the positional relation between the magnets 60a, 60b and the magnetoelectric conversion element 78 is suppressed, the liquid surface sensing device 1 that improves the detection accuracy of the liquid surface 4 can be provided.

Also, according to the second embodiment, because the abutting area between the projections 2050 and the resilient claws 2040 increases by the projections 2050 of a shape lining the second abutting sections 2048, the bearing pressure drops, and therefore breakage of the resilient claws 2040 can be suppressed. Accordingly, durability can be exerted over a long time.

Third Embodiment

Figure 6:
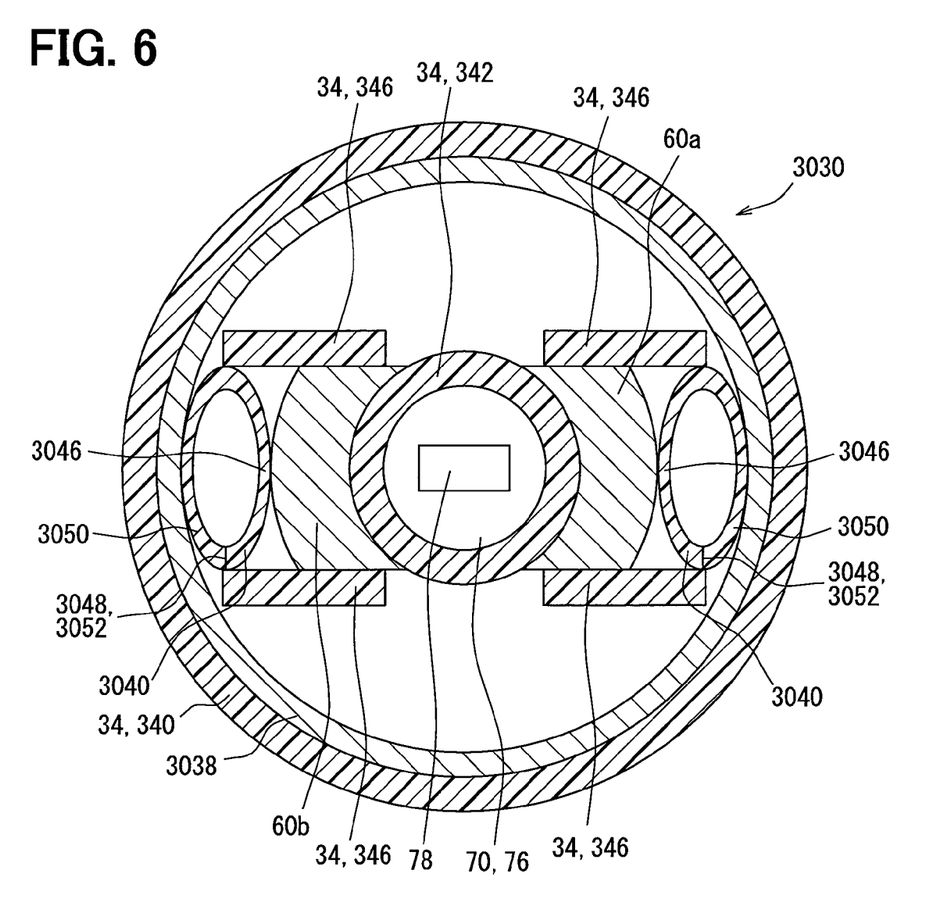
FIG. 6 is a cross-sectional view showing a rotational body in a third embodiment.

As shown in FIG. 6, a third embodiment is a modification of the first embodiment. With respect to the third embodiment, the points different from the first embodiment will be mainly explained.

A rotational body 3030 of the present embodiment includes a magnetic shield member 3038 in addition to the configuration of the first embodiment. The magnetic shield member 3038 is formed of a magnetic material such as iron for example into a cylindrical shape so as to be securely attached to the inner periphery side of the outer peripheral wall 340. The magnetic shield member 3038 suppresses leakage of the magnetic flux of the magnets 60a, 60b to outside the rotational body 30 and suppresses change of the magnetic flux inside the rotational body 30 by foreign matters outside the rotational body 30 by surrounding the pair of magnets 60a, 60b in the peripheral direction.

Also, the storage space 36 is surrounded by the inner surfaces of the storage wall 34 such as the surface on the inner periphery side of the magnetic shield member 3038, the surface on the outer periphery side of the bearing wall 342, the surface on the arm 20 side of the disk bottom wall 344, and the surfaces on the magnets 60a, 60b side adjacent to the stationary walls 346.

Similarly to the first embodiment, in two locations of the storage space 36, the pairs of stationary walls 346 are installed and fixed perpendicularly to the disk bottom. Also, in such two locations, at the gaps formed by the pair of stationary walls 346 that oppose each other, the magnets 60a, 60b similar to those of the first embodiment are fit so as to be securely attached to the surfaces on the outer periphery side of the bearing wall 342. Further, the magnets 60a, 60b are disposed to be apart from the magnetic shield member 3038.

Figure 7:
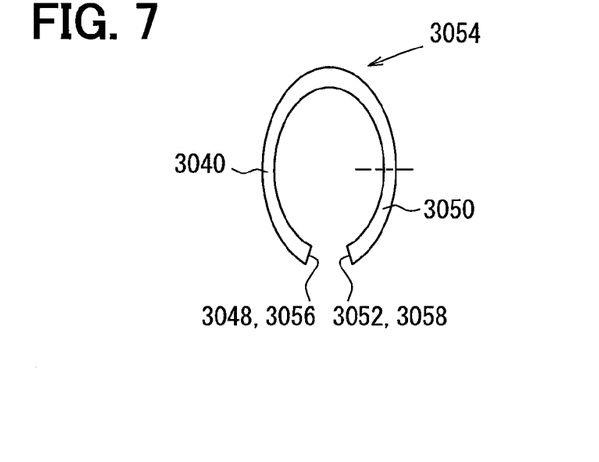
FIG. 7 is a front view showing a state of FIG. 6 before incorporating the resilient claws and the projections.

As shown in FIG. 7, a resilient claw 3040 of the present embodiment is formed to be integral with a projection 3050 and to be separate from the rotational body 3030. More specifically, the resilient claw 3040 and the projection 3050 are made of a resin such as a PPS resin, and are formed to be integral with each other as a plate spring 3054. The plate spring 3054 before being incorporated to the rotational body 3030 is formed to have a C-shape cross section. The resilient claw 3040 occupies approximately ¾ round from one end 3056 of the plate spring 3054. Also, the projection 3050 is a portion excluding the resilient claw 3040 out of the plate spring 3054, and occupies approximately ¼ round from the other end 3058 of the plate spring 3054. Further, a first abutting section 3046 of the resilient claw 3040 is arranged at a position of approximately ¼ round from the one end 3056, and a second abutting section 3048 is arranged at the one end 3056. Also, the second abutting section 3048 is formed into a flat surface shape, and a distal end 3052 of the projection 3050 positioned at the other end 3058 is formed into a flat surface shape lining the second abutting section 3048. The resilient claw 3040 and the projection 3050 thus formed are configured to be resiliently deformed by being pressed from the outside for example.

As shown in FIG. 6, the resilient claw 3040 and the projection 3050 after being incorporated to the rotational body 3030 are stored between the respective magnets 60a, 60b and the magnetic shield member 3038. Also, by abutment of the both ends 3056, 3058 namely the second abutting section 3048 of the resilient claw 3040 and the distal end 3052 of the projection 3050 each other, the resilient claw 3040 and the projection 3050 have an elliptic shape cross section. More specifically, the resilient claw 3040 and the projection 3050 are stored so that the short axis direction of the ellipse agrees to the radial direction of the rotational body 3030, and the magnets 60a, 60b abut upon the first abutting sections 3046 of the resilient claws 3040 in the outer periphery side of the magnets 60a, 60b. Also, the resilient claw 3040 and the projection 3050 are restrained from slipping off from the peripheral direction of the rotational body 3030 by that the long axis direction of the ellipse is surrounded by the pair of stationary walls 346.

Further, the projection 3050 that expands by the reason similar to that of the first embodiment abuts upon the second abutting section 3048 of the resilient claw 3040, and comes to apply a load to the magnet 60a or 60b side, and the load increases corresponding to the expansion.

The actions and effects of the third embodiment will be described. In the third embodiment explained above, with respect to the configurations common to the first embodiment, the actions and effects according to the first embodiment can be exerted by the projections 3050 that abut upon the resilient claws 3040 by expansion.

Also, according to the third embodiment, because of the resilient claw 3040 formed to be integral with the projection 3050 and to be separate from the rotational body 3030, only by fitting the resilient claws 3040 and the projections 3050 to the storage space 36, the drop of the load can be suppressed and the magnets 60a, 60b can be held easily.

Further, according to the third embodiment, because of the projections 3050 of a shape lining the second abutting sections 3048, the bearing pressure of the projections 3050 and the resilient claws 3040 drops by increase of the abutment area, and therefore breakage of the resilient claws 3040 and the projections 3050 can be suppressed. Accordingly, durability can be exerted over a long time.

Although the plurality of embodiments have been explained above, the present disclosure is not to be interpreted to be limited to these embodiments, and can be applied to various embodiments and combinations within a range not departing from the substance of the present disclosure. The modifications of the embodiments described above will be described.

Figure 8:
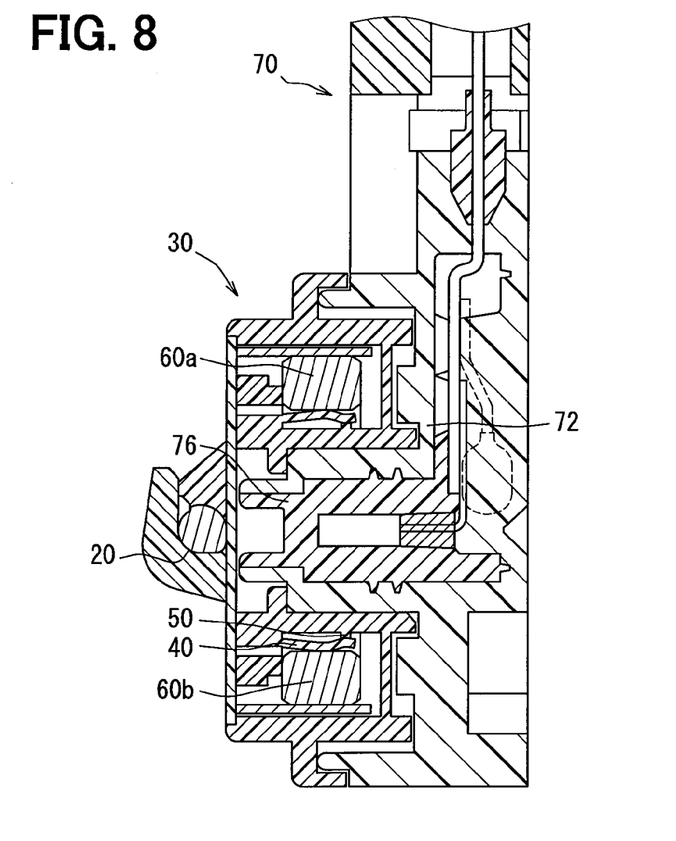
FIG. 8 is a cross-sectional view showing the second modification.
Figure 9:
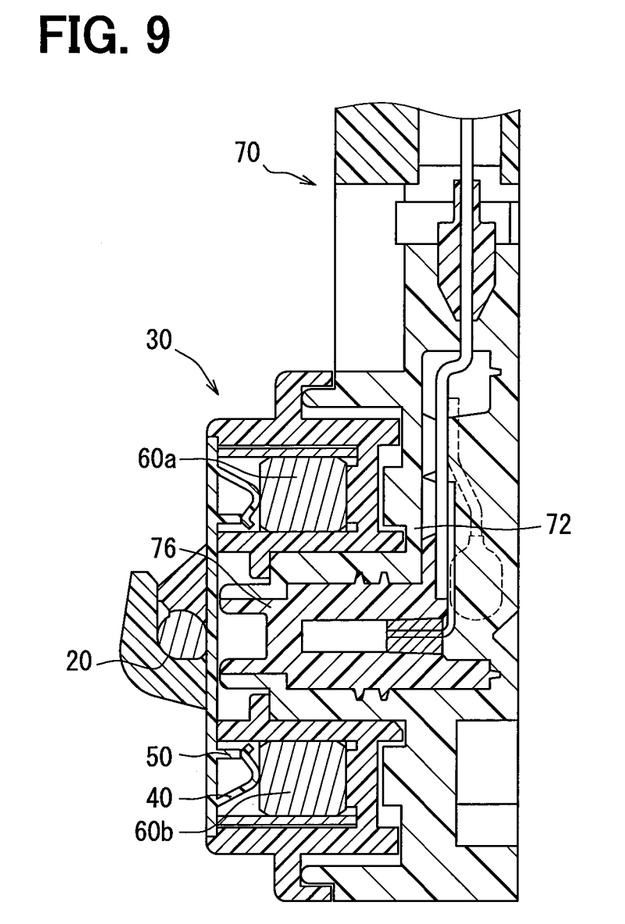
FIG. 9 is a cross-sectional view showing a modification of FIG. 2.
Figure 10:
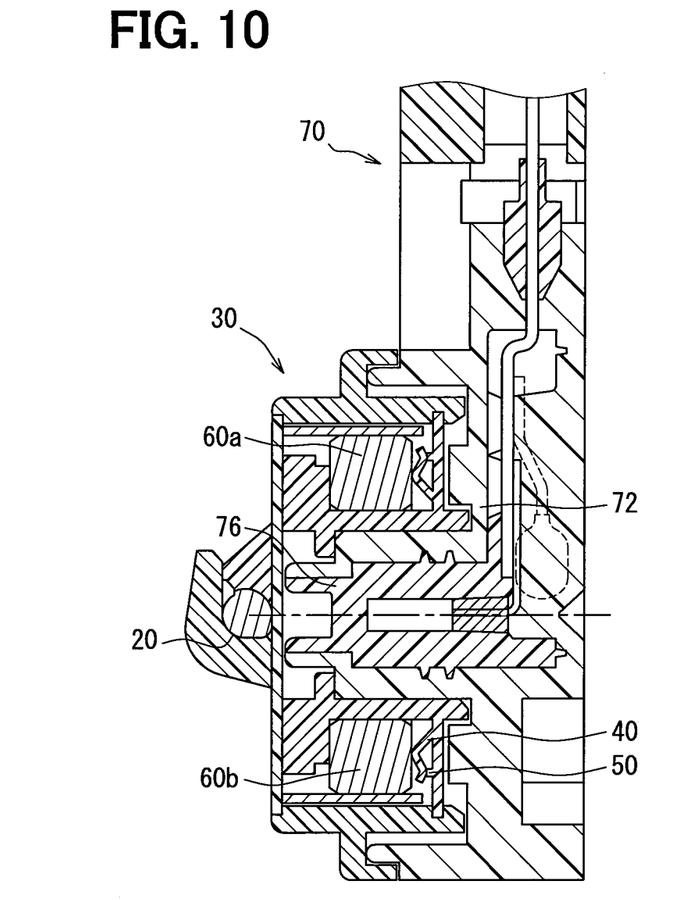
FIG. 10 is a cross-sectional view showing a modification of FIG. 2.

In concrete terms, in the modification 1, as far as the resilient claws 40 press the magnets 60a, 60b to the storage wall 34 of the storage space, the pressing direction may be other than the direction from the outer periphery side to the inner periphery side in the radial direction of the rotational body 30. In an aspect of this example, as shown in FIG. 8, the resilient claws 40 press the magnets 60a, 60b to the direction from the inner periphery side to the outer periphery side in the radial direction of the rotational body 30. Also, in another aspect of this example, as shown in FIG. 9, the resilient claws 40 press the magnets 60a, 60b to the direction from the arm 20 side to the bottom wall 72 side in the axial direction of the shaft section 76. Further, in a still other aspect of this example, as shown in FIG. 10, the resilient claws 40 press the magnets 60a, 60b to the direction from the bottom wall 72 side to the arm 20 side in the axial direction of the shaft section 76.

In the modification 2, the resilient claw 40 and the projection 50 may be arranged by 2 sets or more respectively for one magnet 60a or 60b.

In the modification 3, as far as the projection 50 abuts upon the resilient claw 40 by expansion at the time of use, the projection 50 may not abut upon the resilient claw 40 at the time point the magnets 60a, 60b are incorporated.

In the modification 4, the second abutting section 48 may be arranged at a position same to that of the first abutting section 46.

Figure 11:
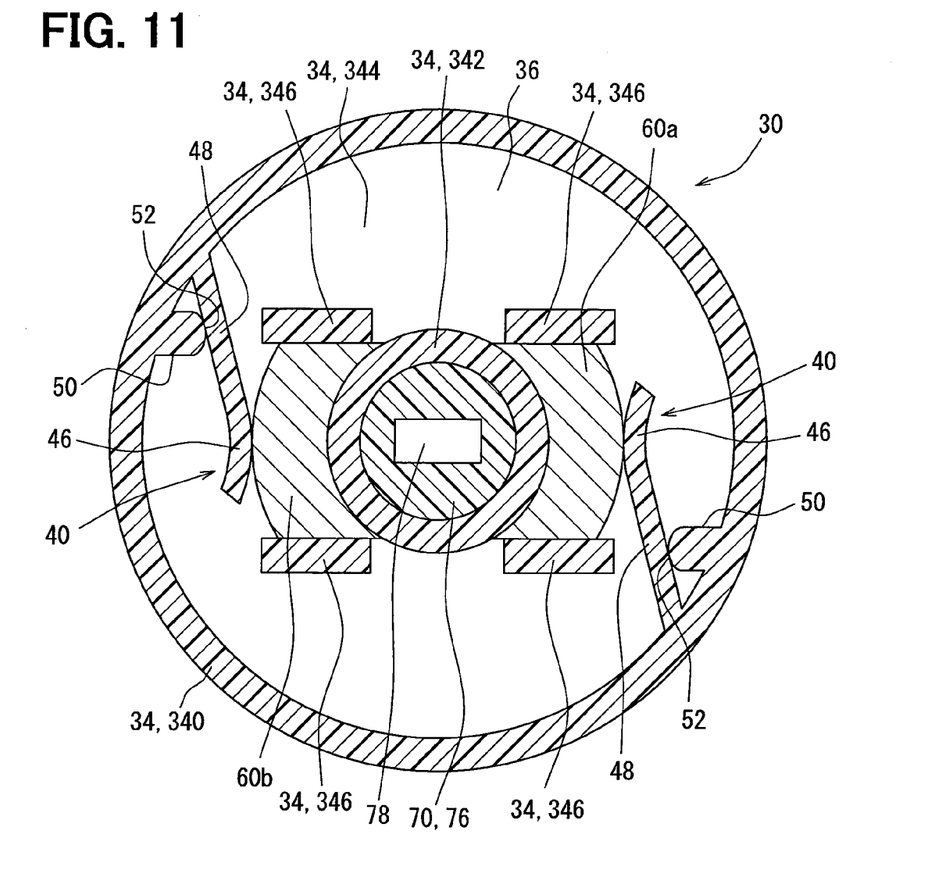
FIG. 11 is a cross-sectional view showing a modification of FIG. 5.

In the modification 5, as far as the projection 50 has a shape of lining the second abutting section 48, the distal end 52 of the projection 50 may be spherical. In this example, as shown in FIG. 11, when the projection 50 applies a load to the second abutting section 48, the resilient claw 40 is resiliently deformed so that the second abutting section 48 bends to the outer periphery side (here the opposite side of the magnet 60a or 60b). Thus, it is designed so that the projection 50 whose distal end 52 is spherical and the second abutting section 48 abut upon each other with a large abutting area. With this configuration, by the projection 50 whose distal end 52 is spherical, the bearing pressure of the projection 50 and the resilient claw 40 drops because the area increases, and therefore breakage of the resilient claw 40 can be suppressed.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A liquid surface sensing device for detecting a surface of liquid in a container, comprising:
    a rotational body that is made of resin and rotates according to upward and downward motion of the surface of liquid;
    a magnet that is held by the rotational body to rotate together with the rotational body;
    a stationary body that is fixed to the container and rotatably bears the rotational body; and
    a magnetoelectric conversion element that is embedded in the stationary body and detects a magnetic field generated by the magnet to output an electric signal indicating the surface of liquid, wherein the rotational body includes:
    a storage space that accommodates the magnet;
    a resilient claw that projects into the storage space and is in contact with the magnet in its resiliently deformed state to press the magnet on a storage wall for the storage space; and
    a projection that projects from an opposite side of the magnet toward the resilient claw in the storage space and expands to be in contact with the resilient claw,
    the projection is in contact with an end region of the resilient claw at only one position, and
    a direction in which the resilient claw projects, and a direction in which the projection projects intersect with each other.

2. The liquid surface sensing device according to claim 1, wherein:
    the resilient claw includes:
        a distal end;
        a first abutting section that is in contact with the magnet; and
        a second abutting section that expands to be in contact with the projection; and
    the second abutting section is provided on the distal end-side of the first abutting section.

3. The liquid surface sensing device according to claim 2, wherein the projection has a shape that is along the second abutting section.

4. The liquid surface sensing device according to claim 2, wherein:
    the resilient claw projects from its root into the storage space;
    the first abutting section is bent toward the opposite side of the magnet on an outer peripheral side of the rotational body; and
    the second abutting section is bent toward the magnet on an inner peripheral side of the rotational body.

5. The liquid surface sensing device according to claim 1, wherein:
    the resilient claw includes:
        a root;
        a first abutting section that is in contact with the magnet; and
        a second abutting section that expands to be in contact with the projection; and
    the second abutting section is provided on the root-side of the first abutting section.

6. The liquid surface sensing device according to claim 5, wherein:
    the resilient claw projects from its root into the storage space;
    the first abutting section is bent toward the opposite side of the magnet on an outer peripheral side of the rotational body; and
    the second abutting section extends linearly.

7. The liquid surface sensing device according to claim 5, wherein the projection has a shape that is along the second abutting section.

8. The liquid surface sensing device according to claim 1, wherein the resilient claw presses the magnet on the storage wall on an inner peripheral side of the rotational body.

9. The liquid surface sensing device according to claim 1, wherein the resilient claw is formed integrally with the projection and is formed separately from the rotational body.

10. The liquid surface sensing device according to claim 1, wherein:
    the resilient claw projects from its root into the storage space along a rotation axis of the rotational body; and
    the resilient claw presses the magnet in its resiliently deformed state in a direction from an inner peripheral side to an outer peripheral side of the rotational body in a radial direction of the rotational body.

11. The liquid surface sensing device according to claim 1, wherein:
    the resilient claw projects from its root into the storage space; and
    the resilient claw presses the magnet in its resiliently deformed state in a direction from the root side to an opposite side of the root along a rotation axis of the rotational body.

* * * * *